United States Patent
Chen et al.

(10) Patent No.: US 12,241,964 B2
(45) Date of Patent: Mar. 4, 2025

(54) TRACKING DIFFERENT SECTIONS OF ARTICULATED VEHICLES

(71) Applicant: Aptiv Technologies AG, Schaffhausen (CH)

(72) Inventors: Susan Yu-Ping Chen, Los Angeles, CA (US); Jan K. Schiffmann, Newbury Park, CA (US)

(73) Assignee: Aptiv Technologies AG, Schaffhausen (CH)

( * ) Notice: Subject to any disclaimer, the term of this patent is extended or adjusted under 35 U.S.C. 154(b) by 312 days.

(21) Appl. No.: 17/651,885

(22) Filed: Feb. 21, 2022

(65) Prior Publication Data

US 2022/0299626 A1    Sep. 22, 2022

Related U.S. Application Data

(60) Provisional application No. 63/194,844, filed on May 28, 2021, provisional application No. 63/185,319,
(Continued)

(51) Int. Cl.
*G01S 13/72* (2006.01)
*B60W 30/09* (2012.01)
(Continued)

(52) U.S. Cl.
CPC .......... *G01S 13/726* (2013.01); *B60W 30/09* (2013.01); *B60W 60/0015* (2020.02);
(Continued)

(58) Field of Classification Search
None
See application file for complete search history.

(56) References Cited

U.S. PATENT DOCUMENTS 11,113,873 B1 *   9/2021   Bosse ...................... G06T 7/10
11,348,340 B1 *   5/2022   Sheng .................. G05D 1/0274
(Continued)

OTHER PUBLICATIONS

"Extended European Search Report", EP Application No. 22160439.0, Aug. 30, 2022, 8 pages.
(Continued)

*Primary Examiner* — Tuan C To
*Assistant Examiner* — David Ruben Pedersen
(74) *Attorney, Agent, or Firm* — Harness, Dickey & Pierce, P.L.C.

(57) ABSTRACT

This document describes techniques and systems related to tracking different sections of articulated vehicles. A vehicle uses a radar system that can discern between unarticulated vehicles and articulated vehicles, which by definition have multiple sections that can pivot in different directions for turning or closely following a curve. The radar system obtains detections indicative of another vehicle traveling nearby. When the detections indicate the other vehicle is articulated, the radar system tracks each identifiable section, rather than tracking all the sections together. A bounding box is generated for each identifiable section; the radar system separately and concurrently monitors a velocity of each bounding box. The multiple bounding boxes that are drawn enable the radar system to accurately track each connected section of the articulated vehicle, including to detect whether any movement occurs between two connected sections, for accurately localizing the vehicle when driving.

20 Claims, 9 Drawing Sheets

Related U.S. Application Data filed on May 6, 2021, provisional application No. 63/162,424, filed on Mar. 17, 2021.

(51) Int. Cl.
*B60W 60/00* (2020.01)
*G01S 7/41* (2006.01)
*G01S 13/931* (2020.01)

(52) U.S. Cl.
CPC .............. *G01S 7/412* (2013.01); *G01S 7/415* (2013.01); *G01S 13/72* (2013.01); *G01S 13/931* (2013.01); *B60W 2420/408* (2024.01); *B60W 2552/30* (2020.02); *B60W 2554/402* (2020.02); *G01S 2013/9315* (2020.01)

(56) References Cited

U.S. PATENT DOCUMENTS

| 2017/0242443 | A1 | 8/2017 | Schuh et al. |
| 2021/0237761 | A1* | 8/2021 | Das ................... G01S 13/89 |
| 2021/0380099 | A1* | 12/2021 | Lee ................. G08G 1/0141 |

OTHER PUBLICATIONS

Ehlgen, et al., "Eliminating Blind Spots for Assisted Driving", IEEE Transactions on Intelligent Transportation Systems, vol. 9, No. 4, Dec. 2008, pp. 657-665.
European Office Action regarding Application No. 22160439.0, mailed Mar. 22, 2024.

* cited by examiner

TRACKING DIFFERENT SECTIONS OF ARTICULATED VEHICLES

CROSS-REFERENCE TO RELATED APPLICATIONS

This application claims the benefit under 35 U.S.C. 119(e) of U.S. Provisional Application No. 63/162,424, filed Mar. 17, 2021, U.S. Provisional Application No. 63/185,319, filed May 6, 2021, and U.S. Provisional Application No. 63/194,844, filed May 28, 2021, the disclosure of each of which is hereby incorporated by reference in its entirety herein.

BACKGROUND

Radar systems can enable a vehicle to detect stationary and non-stationary objects at different ranges. Improved performance is provided by radar over other sensors used by vehicles for autonomous driving or other driving-safety or driving-assistance functions; a radar-equipped vehicle can detect and track objects under many driving conditions, including low light, rain, snow, and fog. Still, under certain conditions, some radar systems may report false detections or fail to detect an object altogether. Inaccurate radar detections may be reported in situations where a radar system struggles to differentiate between multiple objects (e.g., two vehicles traveling in close proximity) or an articulated object (e.g., a truck towing a trailer or a multi-section bus). Consequently, operator intervention and/or compromised driving safety may result.

SUMMARY

This document describes techniques and systems related to tracking different sections of articulated vehicles. In some examples, a radar system for installation on a first vehicle includes at least one processor. The at least one processor is configured to track a second vehicle driving in a field of view of the radar system. The at least one processor is configured to track the second vehicle by generating a first bounding box associated with a first section of the second vehicle and a second bounding box associated with a second section of the second vehicle, and determining, based on a first velocity vector associated with the first bounding box and a second velocity vector associated with the second bounding box, whether the second vehicle is an articulated vehicle. The at least one processor is further configured to, responsive to determining that the second vehicle is the articulated vehicle, perform a driving maneuver by separately and concurrently tracking, in the field of view, the first bounding box and the second bounding box.

This document also describes methods performed by the above-summarized techniques and components and other configurations of the radar system set forth herein, as well as means for performing these methods.

This Summary introduces simplified concepts related to tracking different sections of articulated vehicles, and these are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects for tracking different sections of articulated vehicles are described in this document with reference to the following figures. The same numbers are used throughout the drawings to reference like features and components:

FIG. 1-2 illustrates another example environment in which a vehicle with a radar system is configured to track different sections of an articulated vehicle, in accordance with this disclosure;

FIG. 2 illustrates an example vehicle including a radar system configured to track different sections of an articulated vehicle, in accordance with this disclosure;

FIGS. 4-1 to 4-2 illustrate example environments showing further details of using a radar system that is configured to track different sections of an articulated vehicle, in accordance with this disclosure;

FIGS. 6-1 and 6-2 illustrate aspects of an accuracy improvement function of a radar system that is configured to track different sections of an articulated vehicle, in accordance with this disclosure

DETAILED DESCRIPTION

Overview

Figure 1:
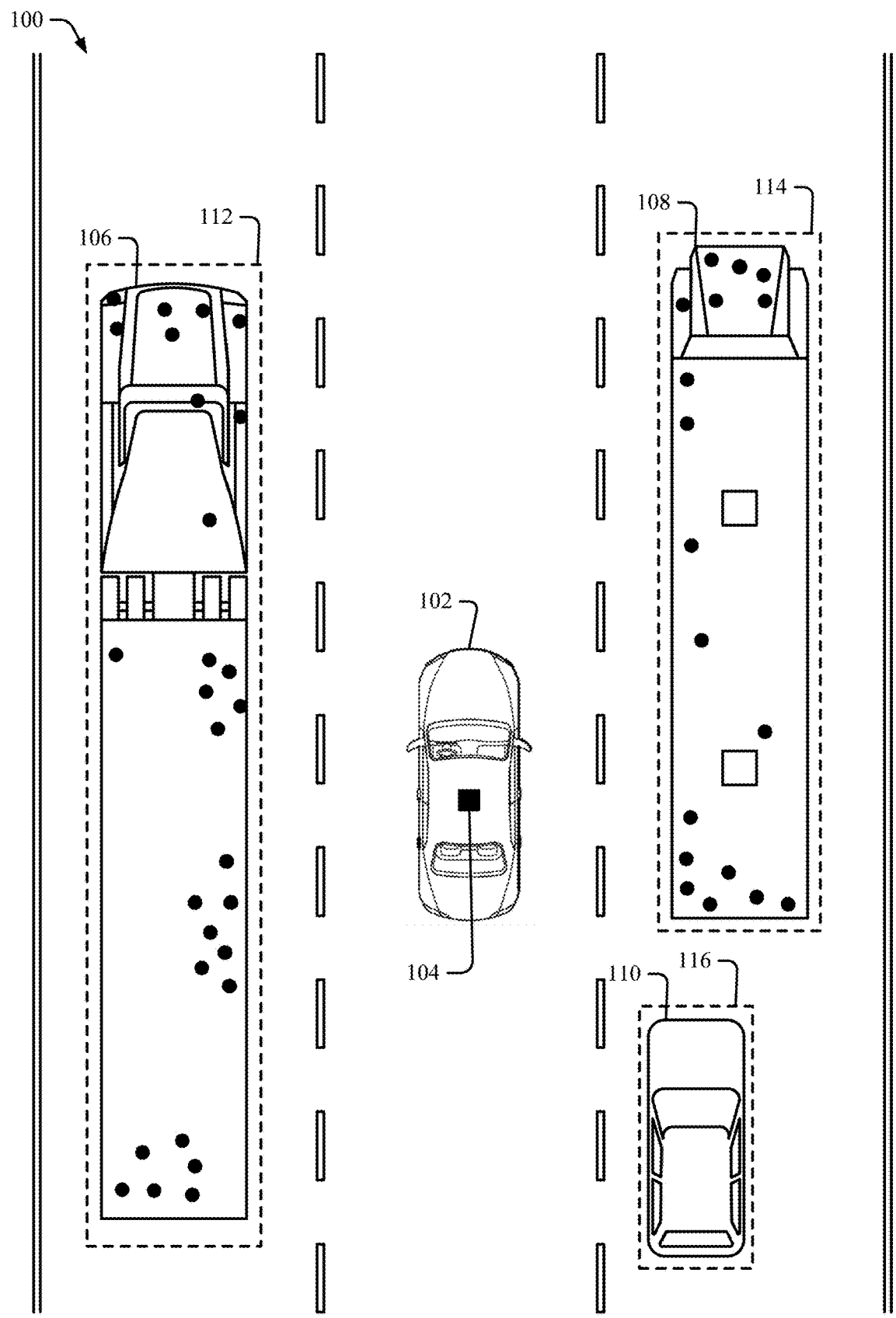
FIG. 1-1 illustrates an example environment in which a vehicle with a radar system is configured to track different sections of an articulated vehicle, in accordance with this disclosure.

In some vehicles, including automobiles equipped with autonomous driving and advanced safety features, a perception system (e.g., a radar system, a lidar system, a camera system, other range sensor) is used to accurately localize the vehicle relative to other objects nearby. The perception system reports a relative position and size of nearby vehicles; an output from the perception system can be used as an input to another system (e.g., an autonomous driving system, an advanced safety system), thereby improving situational awareness and driving safety, including that of passengers of other vehicles.

A rectangular bounding box is commonly used to convey the relative position and size of another vehicle relative to a vehicle. The dimensions of the bounding box approximate groups of detections observed, relative to a vehicle position or position of other detections and/or bounding boxes in a field of view. Using rectangular bounding boxes still may come with some disadvantages.

When multiple vehicles are positioned in close proximity of each other (e.g., when vehicles tailgate by traveling unsafely in the same lane with little separation between them), a perception system can mistake a large group of detections for a single vehicle (e.g., that is greater than one car-length). Instead of drawing multiple bounding boxes to delineate each of the different vehicles, the perception system may inaccurately generate just one bounding box encompassing the entire group of detections. In addition, it is common for long vehicles to be tracked inaccurately. Long vehicles are often articulated, which by definition means the vehicle includes a combination of two or more rigid sections that are configured to pivot about a common hinge. A tractor-trailer, an accordion-style bus, and a truck towing a camper are some examples of articulated vehicles.

In either case, where the perception system is incorrectly treating a group of detections, a rectangular bounding box may not always accurately represent the relative position and size of the one or more objects in the environment.

A perception system may struggle to accurately maintain a bounding box around a group of detections tied to a group of vehicles or a group of vehicle sections, particularly as each of the members of the group is allowed to move independently, even if only to slightly change its own direction or speed. A difference in these velocities can cause a bounding box dimension to stretch as the group of detections grow or shrink as the group of detections diminish (e.g., as an articulation angle, measured at a connecting hinge between to articulating sections increases beyond zero degrees). The perception system may overload a vehicle's onboard computer hardware attempting to resolve the group of detections to maintain the bounding box at its original dimensions (e.g., as the articulation angle increases and decreases with turning and a curvature of a road).

Furthermore, an inaccurately drawn bounding box can be particularly troubling for an autonomous driving or advanced cruise control system that relies on the perception system to make driving decisions. By mistaking a poorly drawn bounding box, the vehicle may incorrectly assume it is safe or unsafe to travel in an adjacent lane, particularly when traveling around a curve. In the real world, the tractor-trailer may safely stay in its travel lane, but to the perception system or other system that relies on its output, the tractor-trailer may appear to be an out-of-control vehicle or a vehicle that requires an unsafe separation distance, which can result in a manual override that requires an operator to take back control.

This document describes techniques and systems related to tracking different sections of articulated vehicles. Specifically, the techniques and systems provide a way for estimating a hinge point and an articulation angle of an articulated vehicle, given perception data obtained from a perception system. For ease of description, the described techniques primarily focus on the context of radar-based tracking, including radar tracking for automotive applications. The techniques may, however, apply to other types of tracking, including other types of tracking in automotive applications, as well as radar and other types of tracking in other non-automotive contexts. Also, for the ease of description, unless otherwise specified, an articulated vehicle has two separate sections, although the techniques generally apply to separately and concurrently tracking all sections of an articulated vehicle, including those with more than two sections.

As one example, a vehicle uses a radar system that can discern between unarticulated vehicles and articulated vehicles, which by definition have multiple sections that can pivot in different directions to assist in turning or closely following a curve in a road. The radar system obtains radar detections indicative of another vehicle traveling nearby. When the radar detections indicate the other vehicle may be an articulated vehicle, the radar system tracks each identifiable section, rather than tracking all the sections together. A bounding box is generated for each identifiable section; the radar system separately and concurrently monitors a velocity of each bounding box. The multiple bounding boxes that are drawn enable the radar system to accurately track each connected section of the articulated vehicle, including to detect whether any movement occurs between two connected sections, for accurately localizing the vehicle when both vehicles share a road. By configuring a perception system to convey, in its output, an articulated vehicle as two or more distinct bounding boxes, the techniques and systems improve driving safety and situational awareness.

Application of the described technique may have benefits for vehicle computer systems, including execution of a driving-software stack, which may include an object-fusion module configured to perform matching and grouping of multiple perception system outputs. In addition, a threat assessment and trajectory planning module that controls a trajectory of the vehicle may benefit from receiving a more-accurate definition of the edges of a target. With a more-accurate representation of an articulated vehicle than a single rectangular box, accuracy of downstream autonomous driving and advanced safety features that rely on the representation (e.g., a radar output) can be improved.

Example Environment

FIG. 1-1 illustrates an example environment 100 in which a vehicle with a radar system is configured to track different sections of an articulated vehicle, in accordance with this disclosure. The environment 100 includes a vehicle 102 equipped with a radar system 104 configured to track different sections of articulated vehicles, in accordance with techniques, apparatuses, and systems of this disclosure. An output from the radar system 104 may enable operations of the vehicle 102. An object's range, angle of approach, or velocity may be determined by the radar system 104 or derivable from the output, which takes the form of radar data.

Although illustrated as a car, the vehicle 102 can represent other types of motorized vehicles (e.g., a motorcycle, a bus, a tractor, a tractor-trailer vehicle, or construction equipment), non-motorized vehicles (e.g., a bicycle), railed vehicles (e.g., a train or a trolley car), watercraft (e.g., a boat or a ship), aircraft (e.g., an airplane or a helicopter), or spacecraft (e.g., satellite). In general, the vehicle 102 represents any moving platform, including moving machinery or robotic equipment, that can benefit from having a radar representation of the environment 100.

Detected in a field of view of the radar system 104 are multiple moving objects 106, 108, and 110 (also sometimes referred to as "targets of interest"). The moving objects 108 and 110 are referred to as unarticulated vehicles 108 and 110. In contrast, the object 106 is referred to as an articulated vehicle 106, which includes at least two discernible sections connected by a hinge. In general, the objects 106, 108, and 110 are composed of one or more materials that reflect radar signals or, in other examples, an appropriate reflection medium for enabling detection by some other type of perception sensing system. Depending on the application, the objects 106, 108, and 110 can represent detections of individual targets, one or more clutter(s) of radar detections, one or more cluster(s) of radar detections, and/or one or more cloud(s) of radar detections. Throughout this disclosure, the detections, the clutter, the clusters, and/or the clouds of radar detections are represented with small circles (dots), where each small dot represents an example of one or more radar detections.

The radar system 104 is configured for installation as part of the vehicle 102. In the depicted environment 100, the radar system 104 is mounted near, or integrated within, a front portion of the vehicle 102 to detect the objects and avoid collisions. The radar system 104 can be a mechanic-replaceable component, part, or system of the vehicle 102, which, due to a failure, may need to be replaced or repaired over the life of the vehicle 102. The radar system 104 can include an interface to at least one automotive system. The radar system 104 can output, via the interface, a signal based on electromagnetic energy received by the radar system 104. The output signal from the radar system 104 represents radar data and can take many forms.

At least one automotive system of the vehicle 102 relies on the radar data that is output from the radar system 104. Examples of such automotive systems include a driver-assistance system, an autonomous-driving system, or a semi-autonomous-driving system. Another example of systems that may rely on the radar data provided by the radar system 104 can include a fusion tracker that combines sensor data from a variety of perception sensors, including the radar system 104, to generate a multi-sensor representation of the environment 100. A benefit to operating a fusion tracker using a multiple-bounding-box representation of an articulated vehicle instead of a single bounding box is that the fusion tracker may operate more efficiently and with greater accuracy. The fusion tracker can quickly combine the radar data with other high-resolution sensor data that aligns with the radar data. With the radar tracking individual sections of an articulated vehicle, the fusion tracker can convey, in its fused output, relative changes in movement between individual sections of an articulated vehicle, providing a sensor fusion output that is more accurate than if fusion tracking with a conventional radar system that is not configured to track articulated vehicles in accordance with the described techniques.

The automotive systems of the vehicle 102 may use radar data provided by the radar system 104 to perform a function, also referred to as a vehicle operation. In the environment 100, the radar system 104 can detect and track the multiple moving objects 106, 108, and 110 by transmitting and receiving one or more radar signals through an antenna system. For example, a driver-assistance system can provide blind-spot monitoring and generate an alert indicating a potential collision with the object 106 detected by the radar system 104. To do so, the radar system 104 can transmit electromagnetic signals between 100 and 400 gigahertz (GHz), between 4 and 100 GHz, or between approximately 70 and 80 GHz. The radar system 104 includes a transmitter (not illustrated) and at least one antenna element to transmit electromagnetic signals. The radar system 104 includes a receiver (not illustrated) and at least one antenna element, which may be the same or different than the transmit element, to receive reflected versions of these electromagnetic signals. The transmitter and the receiver can be incorporated together on the same integrated circuit (e.g., a transceiver integrated circuit or package) or separately on different integrated circuits or chips.

The radar system 104 may track the objects 106, 108, and 110 as they appear to be driving in a field of view. For example, as the radar system 104 increasingly detects a higher count of radar detections, the radar system 104 can detect and track one or more clusters of radar detections, such as at a rear, a middle, and/or a front of the articulated vehicle 106. Without necessarily determining whether the articulated vehicle 106 is articulated, the radar system 104 can at least determine whether the various clusters of radar detections off the object 106 represent a same vehicle or object.

The radar system 104 can create a bounding box 112 for the entire object 106. In furtherance of drawing the bounding box 112, the radar system 104 can determine whether these various clusters of radar detections are stationary or non-stationary; whether the clusters of radar detections associated with the objects 106 move with approximately a same or a different velocity (speed and direction); and whether a range (distance) between each cluster of the object 106 is changing or is nearly constant. Similarly, the radar system 104 can create a bounding box 114 for the object 108 and a bounding box 116 for the object 110. In continuing the example with driver-assistance system receiving radar data from the radar system 104, the radar data may indicate to the driver-assistance system dimensions of the bounding boxes 112, 114, and 116, that the driver-assistance system may use to determine positions of the objects 106, 108, and 110, e.g., for determining when it is safe or unsafe to change lanes. Based on the radar data being output from the radar system 104, an autonomous-driving system may move the vehicle 102 to a particular location on the road while avoiding collisions with the objects 106, 108, and 110.

Articulation Determination

Figures 1, 2:
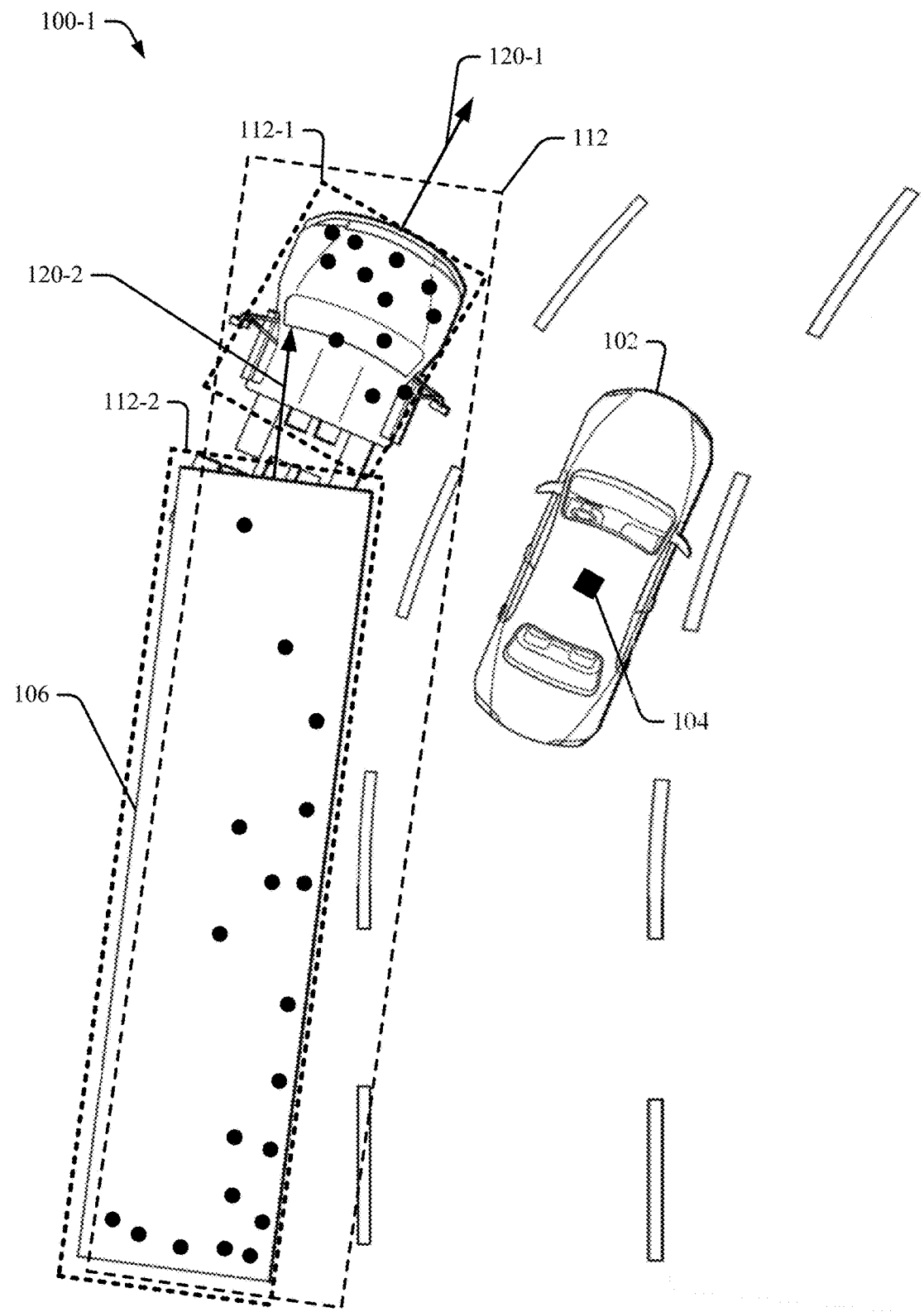
Figure 2:
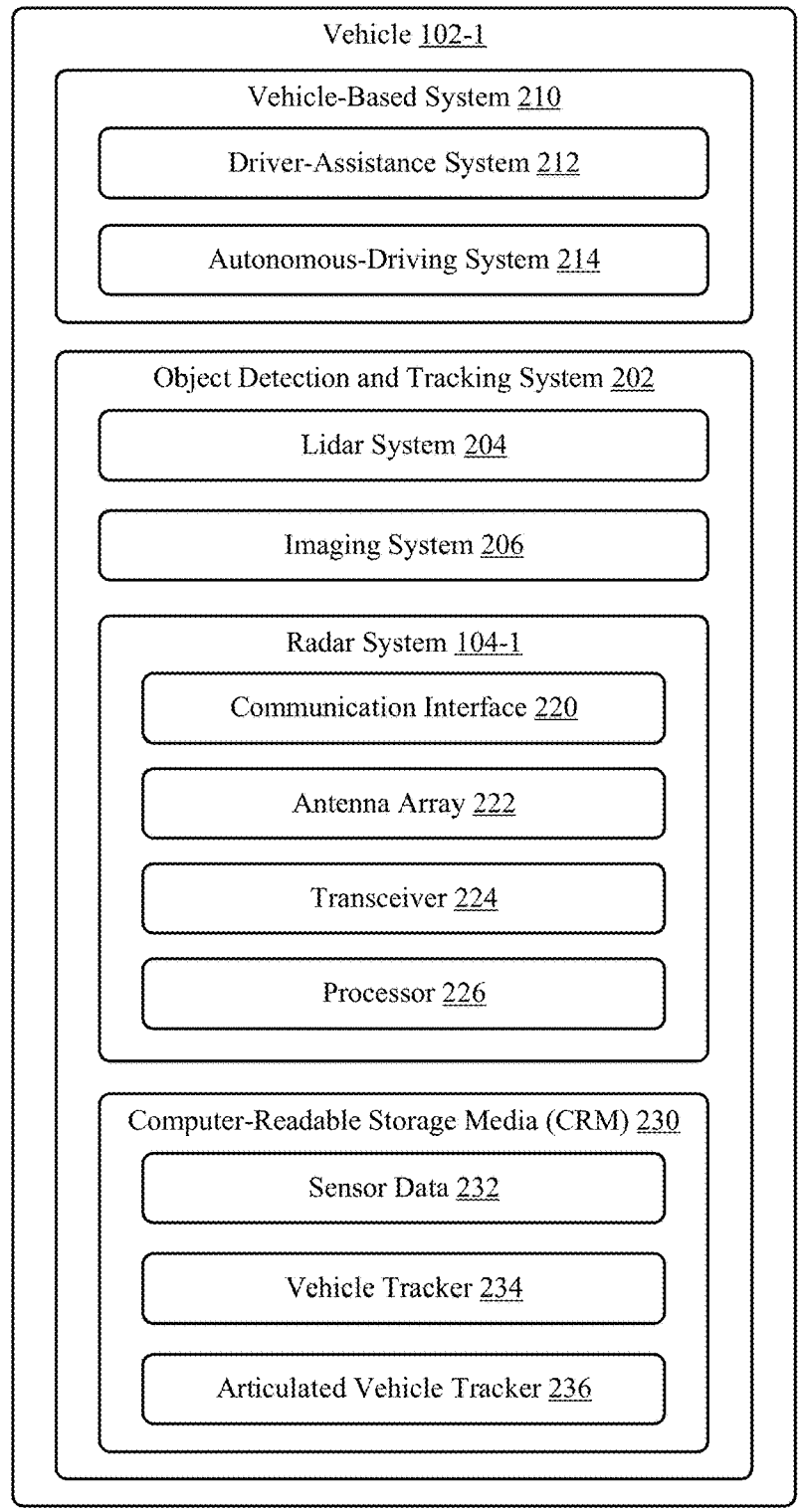

FIG. 1-2 illustrates another example environment 100-1 in which a vehicle with a radar system is configured to track different sections of an articulated vehicle, in accordance with this disclosure. The environment 100-1 is an example of the environment 100, in which the vehicle 102 overtakes or drives adjacent to the articulated vehicle 106 when both vehicles 102 and 106 are driving on a turn.

When approaching the articulated vehicle 106, the radar data output from the radar system 104 may enable the autonomous-driving system of the vehicle 102 to determine whether to perform emergency braking, whether to perform a lane change, whether to adjust a speed, or whether to take any driving action at all. The autonomous-driving system can base those determinations on size, positions, and movement of individual sections of the articulated vehicle 106 relative to safety margins the vehicle 102 uses for driving through traffic.

Other radar systems may track the articulated vehicle 106 with only the single bounding box 112, as shown in both FIGS. 1-1 and 1-2. When driving straight, a single bounding box for an articulated vehicle may be a somewhat accurate representation of the vehicle's size and position. However, when the road turns and the articulated vehicle is made to turn with it, the single bounding box approximation has multiple errors when compared to the vehicle's true size and position. As shown in FIG. 1-2, the bounding box 112 is inaccurately reporting the position of the articulated vehicle 106 so that the articulated vehicle 106 appears to be crossing into a travel lane of the vehicle 102. The vehicle 102, if equipped with a radar system that is not configured in accordance with the techniques of this disclosure, may falsely determine that the articulated vehicle 106 is veering into or out of the travel lane. Therefore, the radar data that is output from these other radar systems may be inaccurate at times (particularly around turns). Consequently, always representing and tracking an articulated vehicle using just a single bounding box can compromise safe driving, especially while driving on a curved or windy road.

Unlike these other types of radar systems, the radar system 104 is configured to determine whether an object being tracked is articulated. The radar system 104 can track individual sections of an articulated vehicle, and output radar data with bounding boxes sized and positioned to correspond to the individual sections being tracked, rather than outputting radar data with a single bounding box that roughly approximates the articulated as a static unarticulated shape. For example, the radar system 104 can generate a bounding box 112-1 at the front of the articulated vehicle 106 and further generate a bounding box 112-2 near the rear of the articulated vehicle 106. As will become clear below, the radar system 104 can track an estimated hinge point between the front and rear sections of the articulated vehicle

106 and maintain resemblance of actual movement of the articulated vehicle 106 in repositioning and rotating the bounding boxes 112-1 and 112-2 about the estimated hinge point.

By individually tracking multiple sections of the articulated vehicle 106 using at least two bounding boxes 112-1 and 112-2 instead of only generating the bounding box 112, the radar system 104 enables the vehicle 102 to drive safely past, or adjacent to, the articulated vehicle 106 with a fluid driving maneuver that is free of hesitation or jerkiness. The radar system 104 does not misrepresent the detections in a course manner using only the bounding box 112. This way, when the articulated vehicle 106 is detected by the radar system 104, the radar data output to the driver-assistance system provides a highly accurate size and position representation of where different articulated sections of the articulated vehicle 106 appear in real life. This enables the vehicle 102 to drive in autonomous or semi-autonomous modes in a smooth and predictable manner, which resembles a driving style of a confident driver that is operating the vehicle 102 in a similar scenario but under manual control.

To enable tracking of articulated sections, the radar system may initially represent the object 106 using the bounding box 112. With most articulated vehicles being longer than a standard passenger vehicle, the radar system 104 can apply a vehicle length-based criterion to the bounding box 112 before expending computing resources to determine whether the object 106 being represented is articulated. This initial filter of smaller vehicles prevents computing sources from having to determine whether every object is an articulated vehicle or not, which improves computational efficiency of the radar system 104.

The radar system 104 may utilize a threshold length (e.g., greater than 3.0 meters), which, when compared to dimensions of the bounding box 112, can be used as an indicator to classify the object 106 as possibly articulated or as not possibly articulated. In other words, whether or not an object is articulated may depend on whether that object is greater than the length threshold (e.g., greater than a regular passenger car length). The radar system 104 may compare a length of the bounding box 112 to the length threshold to determine whether the object 106 has a potential for being articulated, even if (as is illustrated in FIG. 1-1) all sections appear, in the radar data, to be fixed in an unarticulated manner (e.g., when driving on a straight road). This length threshold can be applied by the radar system 104 prior to or as a condition of determining whether the object is actually articulated. This way, if a bounding-box length is estimated to be greater than the threshold length, the object is classified as a possibly articulated vehicle, which is suitable for further processing to determine whether articulation exists. With a bounding box that does not exceed the threshold length, the radar system 104 may classify an object as a short vehicle that is not a possible articulated vehicle, which, therefore, can be tracked using a single bounding box.

Whether a vehicle is articulated or unarticulated is not typically a concern for shorter vehicles that can easily fit within safety margins of a travel lane. This initial length criteria that may be applied by the radar system 104 derives some of its benefit from a relationship that exists between a vehicle length and a turn radius; long vehicles tend to have a wide turn radius. This wide turn-radius makes driving a challenge, particularly when other vehicles are traveling in adjacent lanes or when driving in narrow streets with parked cars and other static moving objects that share the road, which may necessitate reliance on some form of articulation. Because of a hinge connecting two sections that are allowed to pivot, an articulated vehicle, such as the articulated vehicle 106, can make sharper turns (without encroaching on an adjacent lane or shoulder) than an unarticulated vehicle, such as the unarticulated vehicle 108, which is of comparable length. The use of a hinge and articulation configuration is not necessary for a standard-length vehicle, such as the object 110, but more often applies to vehicles that are longer than the standard length. Hence, the radar system 104, responsive to determining that the object 110 is not of sufficient length, can refrain from determining whether the object 110 is articulated or unarticulated and default to tracking the object 110 as an unarticulated vehicle. That said, the ultimate determination as to whether a vehicle is articulated cannot be determined based on length alone.

Another possible indicator of an articulated vehicle is a behavior of the vehicle during a turning maneuver or when driving around a curve. The radar system 104 may initially consider the articulated vehicle 106 and the unarticulated vehicle 108 to both be possible articulated vehicles until the radar system 104 can capture sufficient information about the size and position of any intermediate sections, which often occurs during a turn. That is, eventually, when the road turns or a possible articulated vehicle turns, each individual section that makes up the articulated vehicle 106 can be observed as groups of detections that appear to move with different velocities the further the vehicle travels into a curve. Articulation enables the articulated vehicle 106 to follow a curve more closely than an unarticulated vehicle, such as the unarticulated vehicle 108. In practice, this means that a front section of the articulated vehicle 106 will have a grouping of radar detections that have a velocity 120-1 that is different than a velocity 120-2 of a group of radar detections captured at a tail section of the articulated vehicle 106. Whereas the group of detections at the front of the unarticulated vehicle 108 will appear in the radar data to have a somewhat consistent velocity with the group of detections at the tail of the unarticulated vehicle 108.

Example Device

FIG. 2 illustrates an example vehicle 102-1, including a radar system 104-1 configured to track different sections of an articulated vehicle, in accordance with this disclosure. The radar system 104 is an example of the radar system 104. The vehicle 102-1 is an example of the vehicle 102.

The radar system 104-1 may be part of an object detection and tracking system 202. In addition to the radar system 104-1, the object detection and tracking system 202 may also include a lidar system 204, an imaging system 206, and/or other systems that may be used to detect and track an object. The radar system 104-1, however, can operate as a standalone system without communicating with or using data from the lidar system 204 and/or the imaging system 206. Additionally, the object detection and tracking system 202 can perform the techniques and the methods described herein by using radar data from the radar system 104-1 alone.

The vehicle 102-1 also includes a vehicle-based system 210, such as a driver-assistance system 212 and/or an autonomous-driving system 214. The vehicle-based system 210 uses radar data from the radar system 104-1 to perform a function. For example, the driver-assistance system 212 tracks articulated (e.g., the object 106) and/or unarticulated vehicles (e.g., the objects 108 and 110), monitors their proximity to the vehicle 102-1 and generates an alert that indicates a potential collision or an unsafe distance to the vehicles driving alongside the vehicle 102-1. In this case, radar data (e.g., targets of interest, clutter(s) of radar detections, cluster(s) of radar detections, and/or cloud(s) of radar detections) from the radar system 104-1 indicate whether the vehicle 102-1 may safely drive alongside the other vehicles in the field of view.

As another example, on a windy road, the driver-assistance system 212 suppresses false alerts responsive to radar data indicating that an articulated vehicle (e.g., the object 106) driving on an adjacent lane is veering into a travel lane of the vehicle 102-1. In this way, the driver-assistance system 212 can avoid falsely alerting a driver of the vehicle 102-1 that the articulated vehicle is driving unsafely close or colliding with the vehicle 102-1. By suppressing these false alerts, the driver-assistance system 212 avoids confusing or unnecessarily worrying the driver of the vehicle 102-1.

The autonomous-driving system 214 may move the vehicle 102-1 to a particular location while avoiding collisions with or getting unsafely close to the vehicles driving alongside the vehicle 102-1. The radar data provided by the radar system 104-1 can provide information about the other objects' location and movement to enable the autonomous-driving system 214 to perform emergency braking, perform a lane change, or adjust the vehicle 102-1's speed. Additionally, the autonomous-driving system 214 of the vehicle 102-1 can determine whether a vehicle driving alongside is an articulated vehicle. When driving alongside the articulated vehicle, the autonomous-driving system 214 of the vehicle 102-1 performs a driving maneuver by tracking separately and concurrently the different sections of the articulated vehicle, as is further described below.

The radar system 104-1 includes a communication interface 220 to transmit the radar data to the vehicle-based system 210 or another component of the vehicle 102-1 over a communication bus of the vehicle 102-1. In general, the radar data provided by the communication interface 220 is in a format usable by the object detection and tracking system 202. In some implementations, the communication interface 220 may provide information to the radar system 104-1, such as the speed of the vehicle 102-1 or whether a turning blinker is on or off. The radar system 104-1 can use this information to appropriately configure itself. For example, the radar system 104-1 can determine if a selected object (e.g., 106) is stationary by comparing a Doppler for the selected object to the speed of the vehicle 102-1. Alternatively, the radar system 104-1 can dynamically adjust the field of view or in-lane azimuth angles based on whether a right-turning blinker or a left-turning blinker is on.

The radar system 104-1 also includes at least one antenna array 222 and at least one transceiver 224 to transmit and receive radar signals. The antenna array 222 includes at least one transmit antenna element and a plurality of receive antenna elements separated in azimuth and elevation directions. In some situations, the antenna array 222 also includes multiple transmit antenna elements to implement a multiple-input multiple-output (MIMO) radar capable of transmitting multiple distinct waveforms at a given time (e.g., a different waveform per transmit antenna element). The antenna elements can be circularly polarized, horizontally polarized, vertically polarized, or a combination thereof.

Using the antenna array 222, the radar system 104 can form beams that are steered or un-steered and wide or narrow. The steering and shaping can be achieved through analog beamforming or digital beamforming. The one or more transmitting antenna elements can have, for instance, an un-steered omnidirectional radiation pattern or can produce a wide steerable beam to illuminate a large volume of space. To achieve target angular accuracies and angular resolutions, the receiving antenna elements can be used to generate hundreds of narrow steered beams with digital beamforming. In this way, the radar system 104-1 can efficiently monitor an external environment and detect one or more sections of an articulated vehicle, such as a first section of an articulated vehicle and a second section of the articulated vehicle.

The transceiver 224 includes circuitry and logic for transmitting and receiving radar signals via the antenna array 222. Components of the transceiver 224 can include amplifiers, mixers, switches, analog-to-digital converters, or filters for conditioning the radar signals. The transceiver 224 also includes logic to perform in-phase/quadrature (I/Q) operations, such as modulation or demodulation. A variety of modulations can be used, including linear frequency modulations, triangular frequency modulations, stepped frequency modulations, or phase modulations. The transceiver 224 can be configured to support continuous-wave or pulsed radar operations. A frequency spectrum (e.g., range of frequencies) that the transceiver 224 uses to generate the radar signals can encompass frequencies between one and four-hundred gigahertz (GHz), between four and one hundred GHz, or between approximately seventy and eighty GHz, for example. The bandwidths can be on the order of hundreds of megahertz or on the order of gigahertz.

The radar system 104-1 also includes one or more processors 226. The processor 226 can be implemented using any type of processor, for example, a central processing unit (CPU), a microprocessor, a multi-core processor, and so forth. Although the processor 226 is illustrated as being part of the radar system 104-1, the processor 226 can be part of the object detection and tracking system 202 and may support the lidar system 204 and the imaging system 206, in addition to the radar system 104-1.

The object detection and tracking system 202 that includes the radar system 104-1 also includes one or more computer readable media (CRM) 230 (e.g., a computer-readable storage medium), and the CRM 230 excludes propagating signals. The CRM 230 may include various data-storage media, such as volatile memory (e.g., dynamic random-access memory, DRAM), non-volatile memory (e.g., Flash), optical media, magnetic media, and so forth. The CRM 230 may include instructions (e.g., code, algorithms) that may be executed using the processor 226. The instructions (not illustrated) stored in the CRM 230, in part, interpret, manipulate, and/or use sensor data 232 that may also be stored in the CRM 230. The sensor data 232 includes the radar data (e.g., clutters of radar detections, clusters of radar detections, and/or clouds of radar detections) of the radar system 104-1. The sensor data 232 may also include lidar data of the lidar system 204 and imaging data (e.g., video, still frames) of the imaging system 206. In one aspect, the instructions stored in the CRM 230 include a vehicle tracker 234 and an articulated vehicle tracker 236.

The vehicle tracker 234 may share some similarities with an existing vehicle tracker and can detect and track stationary and/or non-stationary objects. The vehicle tracker 234 can determine whether various clusters of radar detections are being reflected from one object or multiple objects. The vehicle tracker 234 can generate a bounding box for each detected vehicle in the proximity of the vehicle 102-1. The vehicle tracker 234 may determine and track a location, a centroid, and a velocity vector of each bounding box. Unlike other existing vehicle trackers, however, the vehicle tracker 234 may categorize and treat long vehicles differently in the proximity of the vehicle 102-1. Specifically, once the vehicle tracker 234 determines that a vehicle meets or exceeds a threshold length (e.g., greater than 3.0 meters), the vehicle tracker 234 triggers the articulated vehicle tracker 236 to make a determination about whether the target is an articulated vehicle.

The articulated vehicle tracker 236 helps determine whether a vehicle is articulated or unarticulated. If the articulated vehicle tracker 236 determines that a vehicle is articulated, the articulated vehicle tracker 236 then determines a location of a hinge point, where the hinge point couples or connects a first section (first part) and a second section (second part) of the articulated vehicle. Using the articulated vehicle tracker 236, the radar system 104-1 of the vehicle 102-1 can track separately and concurrently the first and the second sections of the articulated vehicle. The articulated vehicle tracker 236 can generate a first bounding box associated with a first section (e.g., front-end section) of a possible articulated vehicle and a second bounding box (e.g., rear-end section) associated with a second section of the possible articulated vehicle. The articulated vehicle tracker 236 enables the radar system 104 to track separately and concurrently the first and the second bounding boxes of the suspected articulated vehicle.

The radar system 104-1 may use the vehicle tracker 234 and the articulated vehicle tracker 236 concurrently. The articulated vehicle tracker 236 may also use the lidar system 204 to estimate a closest edge to the vehicle 102-1 of the articulated vehicle. Before describing the articulation determination in detail, next, FIG. 3 describes shortcomings of some other existing vehicle trackers that may track an articulated vehicle using only a single bounding box as opposed to using multiple boxes, as is done with the radar system 104-1.

Figure 3:
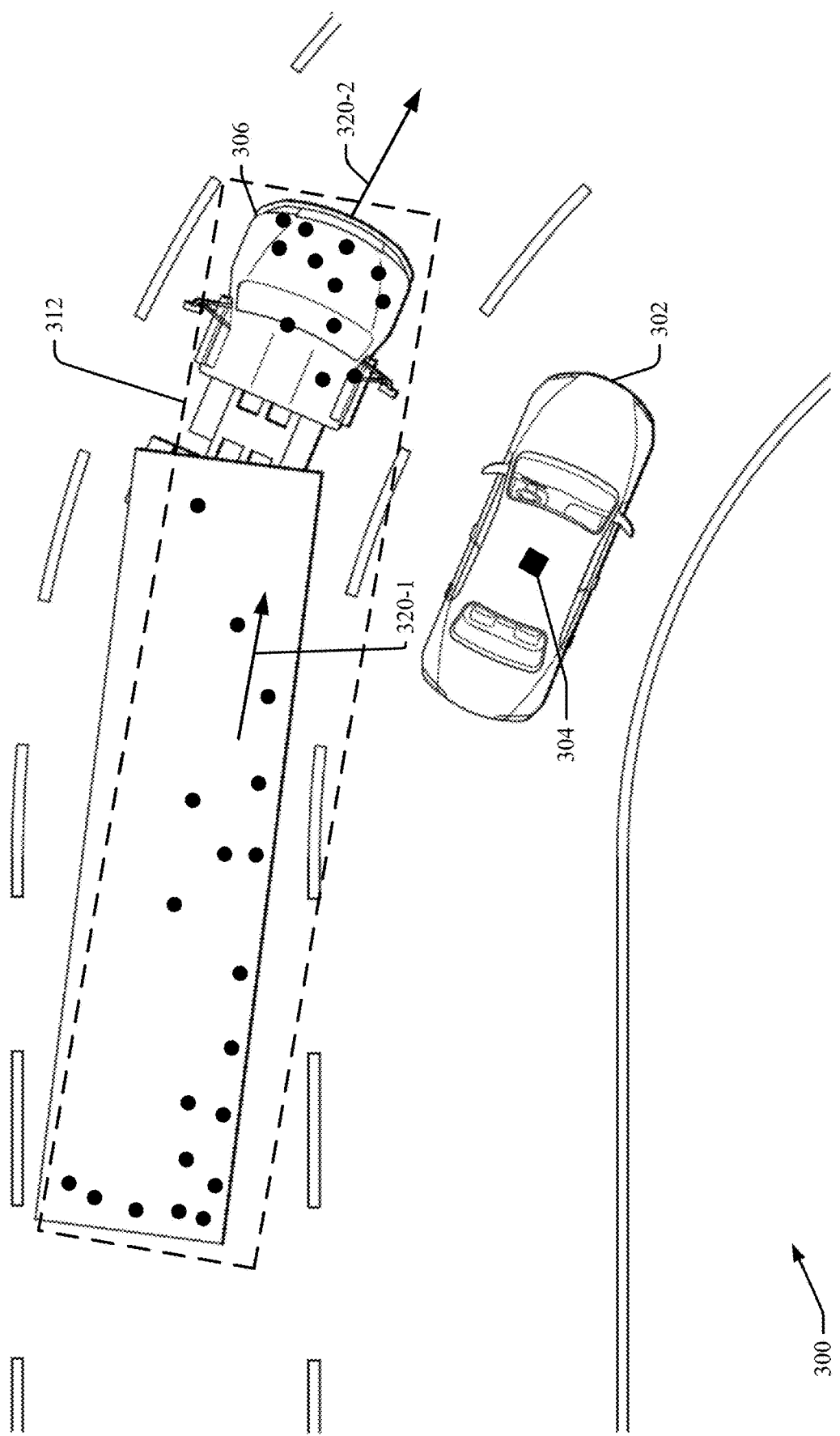
FIG. 3 illustrates an example environment showing some drawbacks of using a conventional radar system, which is not configured to track different sections of an articulated vehicle.

FIG. 3 illustrates an example environment 300 showing some drawbacks of using a conventional radar system, which is not configured to track different sections of an articulated vehicle. The environment 300 includes a portion of a road that turns to the right. A tractor-trailer vehicle 306, which is an articulated vehicle, drives alongside a vehicle 302 that is equipped with a traditional radar system that is unable to discern whether articulation exists with a target. Unlike the vehicle 102-1, the vehicle 302 uses a radar system 304 without the aid of the articulated vehicle tracker 236. The existing radar system 304 fails to determine that the tractor-trailer vehicle 306 is an articulated vehicle. Instead, the existing radar system 304 may detect and track the tractor-trailer vehicle 306 as being non-articulated. This may be a reasonable approach if the vehicle 302 and the tractor-trailer vehicle 306 always drive on straight road lanes, but this approach fails as the vehicles drive on a bendy or curvy portion of the road, as is illustrated in FIG. 3.

In one aspect, the radar system 304 may detect one or more clusters of radar detections at a rear, a front, and anywhere in-between the tractor-trailer vehicle 306. The radar system 304 may then determine that all the radar detections are associated with a single vehicle, in FIG. 3, the tractor-trailer vehicle 306. The radar system 304 can then create a single bounding box 312 for the whole tractor-trailer vehicle 306. As is illustrated in FIG. 3, by not using the articulated vehicle tracker 236, the tracked velocity vector 320-1 is inconsistent with a velocity vector 320-2 of the tractor-trailer vehicle 306. More importantly, the bounding box 312 fails to accurately represent where the tractor-trailer vehicle 306 is located on the road, relative to a position of the vehicle 302. Instead, as both vehicles 320 and 306 may make a right turn, the bounding box 312 appears to encroach closer to the vehicle 302 within an unsafe separation distance. Consequently, by using the radar system 304, a driving system (e.g., an autonomous-driving system) of the vehicle 302 may overcorrect motion of the vehicle 302 and cause the vehicle 302 to drive unsafely into another lane, driving outside the road, speeding up, breaking, or performing any other unnecessary driving maneuver, which may diminish driving safety and reduce passenger comfort.

Hinge Points and Articulation Angles

Figures 1, 4:
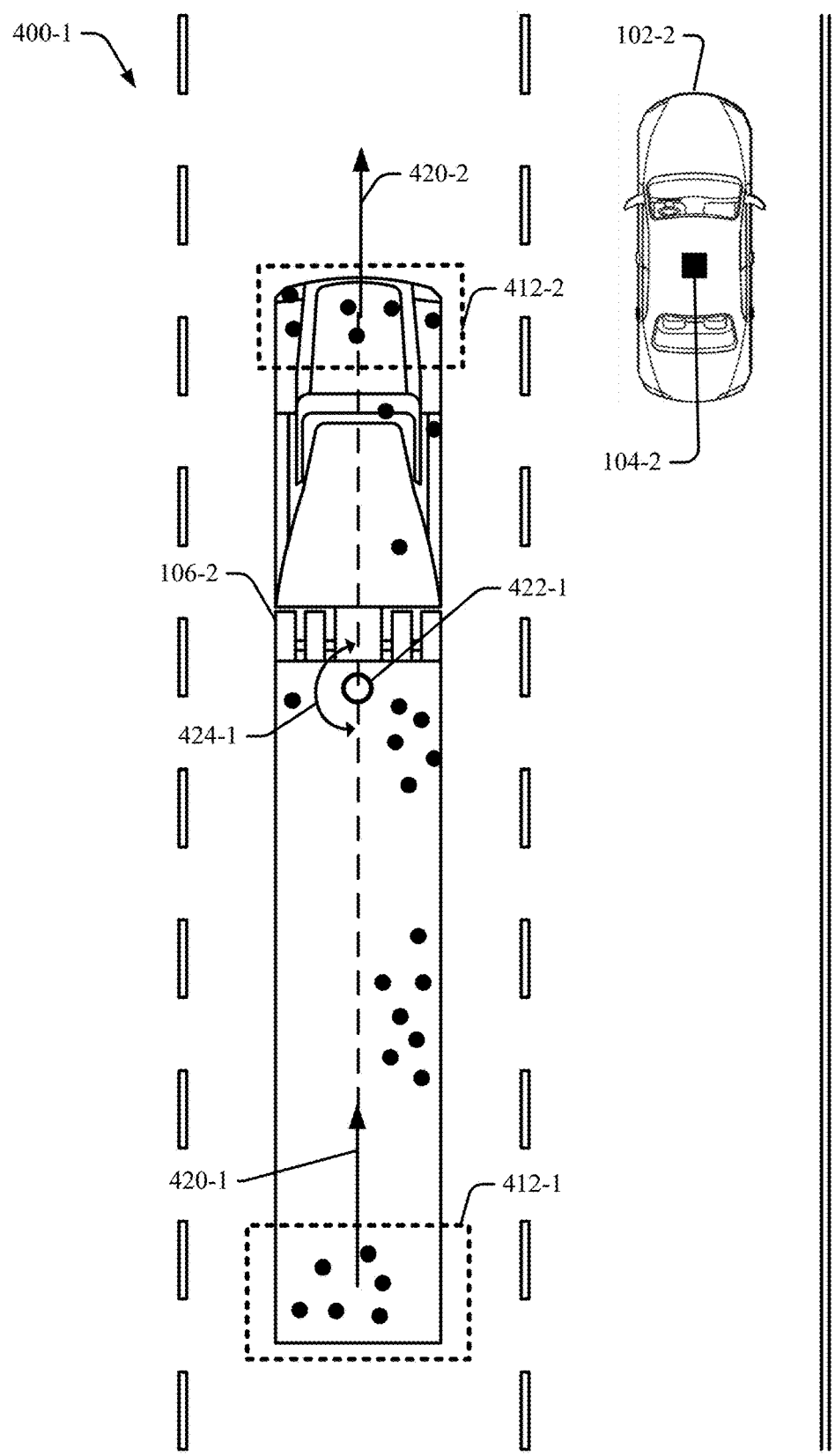
Figures 2, 4:
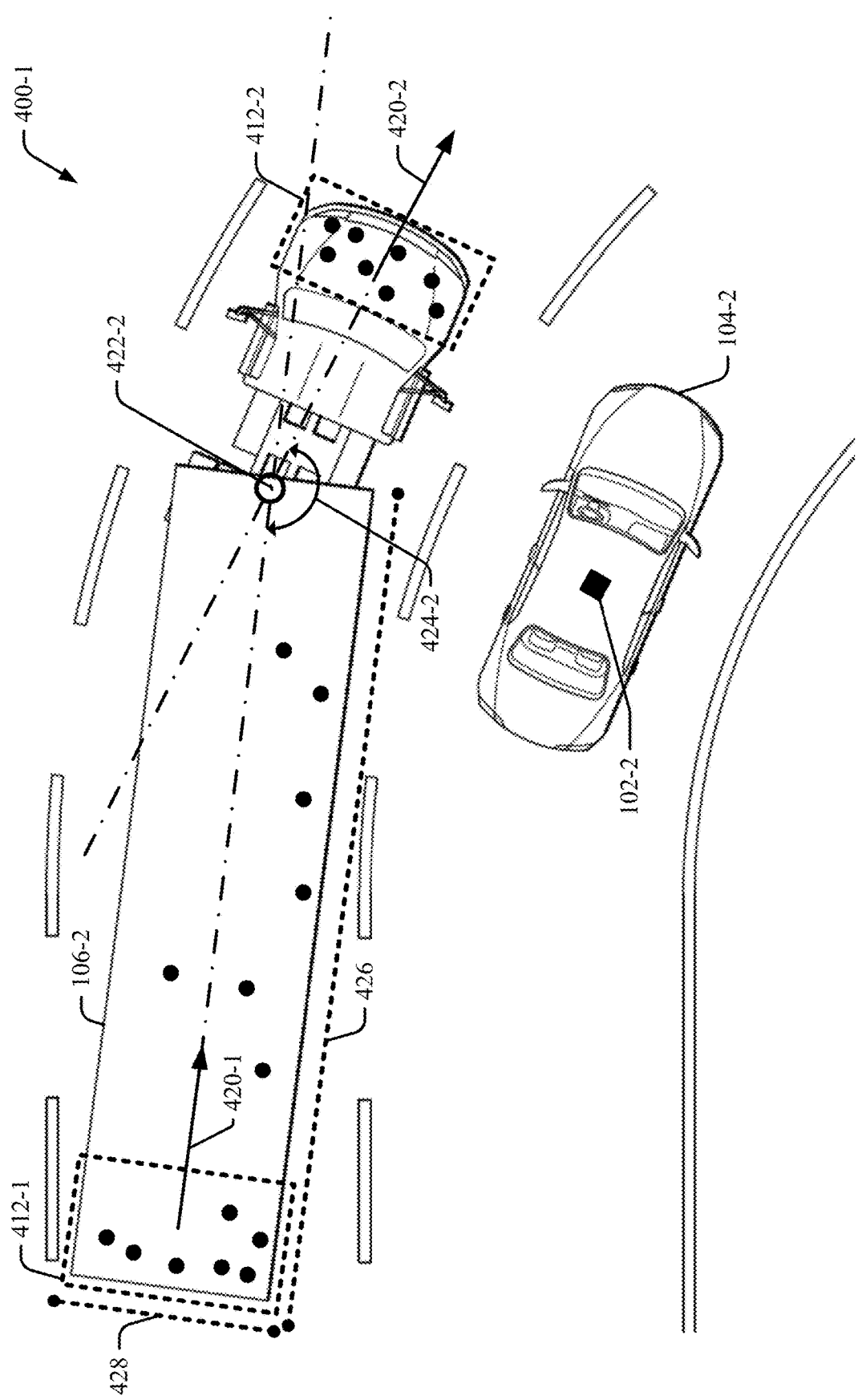

FIGS. 4-1 to 4-2 illustrate example environments 400-1 and 400-2, showing further details of using a radar system that is configured to track different sections of an articulated vehicle, in accordance with this disclosure. The environments 400-1 and 400-2 are described in the context of FIGS. 1 and 2. Each of the environments 400-1 and 400-2 includes a vehicle 102-2, which is an example of the vehicles 102 and 102-1. Driving in an adjacent lane to the vehicle 102-2 is a semi-tractor trailer 106-2, which is an example of the objects 106-1 and 106.

Focusing first on FIG. 4-1, in response to the radar system 104-2 identifying the semi-tractor trailer 106-2 as a long vehicle, the vehicle tracker 234 invokes the articulated vehicle tracker 236 for further processing of the radar data produced by the radar system 104-2 to determine whether an object being tracked by the vehicle tracker 234 is articulated.

Independent of how the vehicle tracker 234 treats the semi-tractor trailer 106-2, the articulated vehicle tracker 236 begins tracking a suspected articulated vehicle by locating a hinge point between two sections of the suspected articulated vehicle. For example, the articulated vehicle tracker 236 can tell that a large group of detections at the back of the semi-tractor trailer are moving consistently with another group of detections at the front of the semi-tractor trailer. A hinge point 422-1 can be determined to be at an intersection between a velocity vector 420-1 of the back section and a velocity vector 420-2 of the front section. The articulated vehicle tracker 436 can generate a first bounding box 412-1 around the back section and a second bounding box 412-2 around the front section. The articulated vehicle tracker 236 determines the hinge point 422-1 to be between the first and second bounding boxes 412-1 and 412-2, such that they are not overlapping. In this situation, the articulation angle 424-1 between the first bounding box 412-1 and the second bounding box 412-2 is approximately zero degrees. When the articulation angle 424-1 is near zero, the hinge point 422-1 determination can be difficult to resolve.

Switching to FIG. 4-2, the articulated vehicle tracker 236 may wait until the vehicle 102-2 and the semi-tractor trailer 106-2 are driving on a curved road or taking a turn before establishing a hinge point 422-2. In this situation, the articulation angle 424-2 between the first bounding box 412-1 and the second bounding box 412-2 is greater than zero degrees. The articulated vehicle tracker 236 can extrapolate the velocity vector 420-1 and the velocity vector 420-2 to find the intersection at which the hinge point 422-2 estimation is made.

Upon extrapolating out to the hinge point 422-2, the articulated vehicle tracker 236 can regularly update its calculations to improve its track on the semi-tractor trailer 106-2. For example, as a turn becomes increasingly sharper, the articulated vehicle tracker 236 may identify an increasing difference in the velocity vectors 420-1 and 420-2. This increase in the articulation angle 424-2 provides an increased accuracy in the hinge point 422-2. Depending on the capability of the radar system 104-2, the hinge point 422-2 may become valid for subsequent use in controlling the vehicle 102-1 in response to a degree of certainty in the calculation being achieved. The articulated vehicle tracker 236 may output a degree of certainty or confidence associated with its radar data calculations, including the hinge point 422-2. When the articulation angle 424-2 is near zero degrees, this degree of certainty may be low, whereas when the articulation angle 424-2 deviates from zero degrees, the confidence in the hinge point 422-2 is increasing.

Based on the estimated hinge point 422-2 and the articulation angle 424-2, the articulated vehicle tracker 236 determines, based further on an estimated width of the object 106-2 being tracked, positions and orientations of one or more side edges 426 of the articulated vehicle being tracked. A width 428 of the object 106-2 being tracked corresponds to the estimated width of either of the bounding boxes 412-1 and 412-2. The width 428 of the object 106-2, the hinge point 422-2, and the articulation angle 424-2 are used by the articulated vehicle tracker 236 to estimate the locations of the side edges 426 of the vehicle. In some cases, a remote processing service may assist in analyzing radar data collected during this time to aid in resolving the locations of the side edges 426. Low-pass filtering may be used to reduce noise on these estimates. Long-term understanding of the hinge point 422-2 and the articulation angle 424-2 as determined over time can be used as feedback information to help reduce noise levels and improve accuracy of the bounding boxes 412-1 and 412-2, which are now linked to movement of individual articulated sections. The articulated vehicle tracker 236 may output a position of the edge 426 of the semi-tractor trailer 106-2 that is closest to the vehicle 102 as an indication of a safety buffer zone.

The articulated vehicle tracker 236 may determine the width 428 of the first bounding box 412-1 in addition to determining the width 428 of the second bounding box 412-2, from which an overall width 428 of the semi-tractor trailer 106-2 is estimated (e.g., by averaging, by taking a greater of). To estimate the closest edge 426 of the semi-tractor trailer 106-2, the articulated vehicle tracker 236 uses the hinge point 422-2, the articulation angle 424-2, and the width 428 to estimate a portion of the edge 426 between two articulated sections. By providing a highly accurate representation of the semi-tractor trailer 106-2, as it turns, the articulated vehicle tracker 236 enables the vehicle 102-2 to be able to safely drive adjacent to the semi-tractor trailer 106-2, without any false pre-collision warnings that might otherwise happen if the semi-tractor trailer 106-2 were tracked with just one bounding box, instead of the two bounding boxes 412-1 and 412-2.

Example Process

Figure 5:
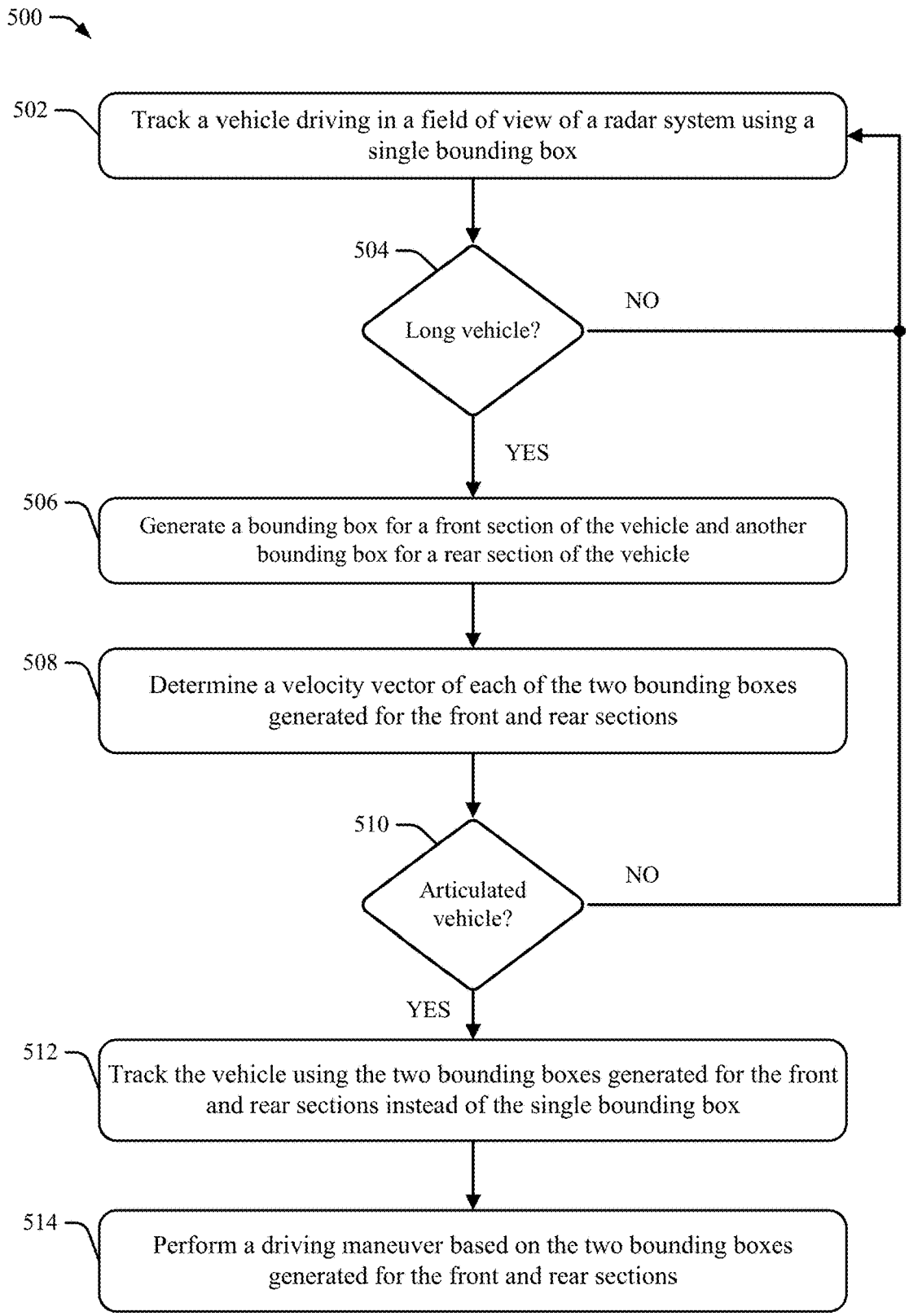
FIG. 5 illustrates a process for tracking different sections of an articulated vehicle, in accordance with this disclosure.

FIG. 5 illustrates a process 500 for tracking different sections of an articulated vehicle, in accordance with this disclosure. The process 500 is shown as a set of operations (or acts) performed but not necessarily limited to the order or combinations in which the operations are shown herein. Further, any of one or more of the operations may be repeated, combined, or reorganized to provide other methods. In portions of the following discussion, reference may be made to entities detailed in the other drawings, reference to which is made for example only. The process 500 is not limited to performance by one entity or multiple entities.

At 502, a vehicle driving in a field of view of a radar system is tracked using a single bounding box. For example, the radar system 104 can track the object 106 in a field of view using the bounding box 112.

At 504, whether the vehicle is a long vehicle is determined. For example, the radar system 104 compares a length of the bounding box 112 to a length threshold. If this length is less than the threshold, the NO branch from 504 is taken, and the object 106 is tracked with the bounding box 112 alone. However, in response to determining that the object 106 is a long vehicle based on the length exceeding the length threshold, the YES branch from 504 is taken. This point in the process 500 coincides with the vehicle tracker 234 invoking the articulated vehicle tracker 236, which may represent two parallel tracking schemes until the radar system 104 is confident that the object 106 can be tracked with only one bounding box or if multiple bounding boxes should be used, in the case of articulation.

At 506, a bounding box for a front section of the vehicle and another bounding box for a rear section of the vehicle are determined. For example, the radar system 104 may generate bounding boxes 112-1 and 112-2.

At 508, a velocity vector determined for each of the two bounding boxes generated for the front and rear sections is determined. For example, the bounding boxes 112-1 and 112-2 are characterized by the velocity vector 120-1 and the velocity vector 120-1.

At 510, whether the vehicle is articulated is determined. For example, the velocity vectors 120-1 and 120-2 are monitored. A hinge point can be determined by estimating an intersection between the two velocity vectors 120-1 and 120-2, particularly when the object 106 is traveling around a turn and the front and rear sections, if articulated, are allowed to move in different directions. If the articulation angle at the hinge point remains near zero degrees, even during a turning maneuver, the NO branch from 510 is taken and the vehicle is determined to be unarticulated. If the articulation angle at the hinge point increases above zero degrees, particularly during a turning maneuver, the YES branch from 510 is taken and the vehicle is determined to be articulated.

At 512, the vehicle is tracked using the two bounding boxes generated for the front and rear sections instead of the single bounding box. For example, the two bounding boxes 112-1 and 112-2 may replace the bounding box 112. In other examples, the bounding box 112 may be generated in addition to the two bounding boxes 112-1 and 112-2, with the bounding box 112 being designated as a less accurate solution for the object 106.

At 514, a driving maneuver is performed based on the two bounding boxes generated for the front and rear sections. For example, the radar system 104 outputs to an autonomous driving system an indication of the two bounding boxes 112-1 and 112-2. With an estimated nearest edge of the object 106 determined from dimensions of the bounding boxes 112-1 and 112-2, the vehicle 102 can drive safely adjacent or otherwise near the object 106 without receiving false alarms or false reporting of potential collision situations.

As another example, consider the radar system 104 tracking the object 108 using the bounding box 114. In this example, the object 108 is a school bus and, therefore, unarticulated.

For example, at 504, the radar system 104 compares a length of the bounding box 114 to a length threshold. If this length is less than the threshold, the NO branch from 504 is taken and the object 108 is tracked with the bounding box 114 alone. However, in response to determining that the object 108 is a long vehicle based on the length exceeding the length threshold, the YES branch from 504 is taken.

At 506, the radar system 104 produces a bounding box for a front section of the object 108, and another bounding box for a rear section of the object 108 is determined.

At 508, a velocity vector determined for each of the two bounding boxes generated for the front and rear sections of the object 108 is evaluated to determine, at 510, whether the object 108 is articulated. For instance, a hinge point can be determined by estimating an intersection between two velocity vectors, particularly when the object 108 travels around a turn and the front and rear sections, if articulated, are allowed to move in different directions. If the articulation angle at the hinge point remains near zero degrees, even during a turning maneuver, the NO branch from 510 is taken and the object 108 is determined to be unarticulated. The unarticulated vehicle is tracked using just the single bounding box 114. A driving maneuver can be performed using an edge of the bounding box 114 to keep the vehicle 102 out of the path of the object 118, particularly when in an adjacent lane during a turn.

Accuracy Improvement

Figures 1, 6:
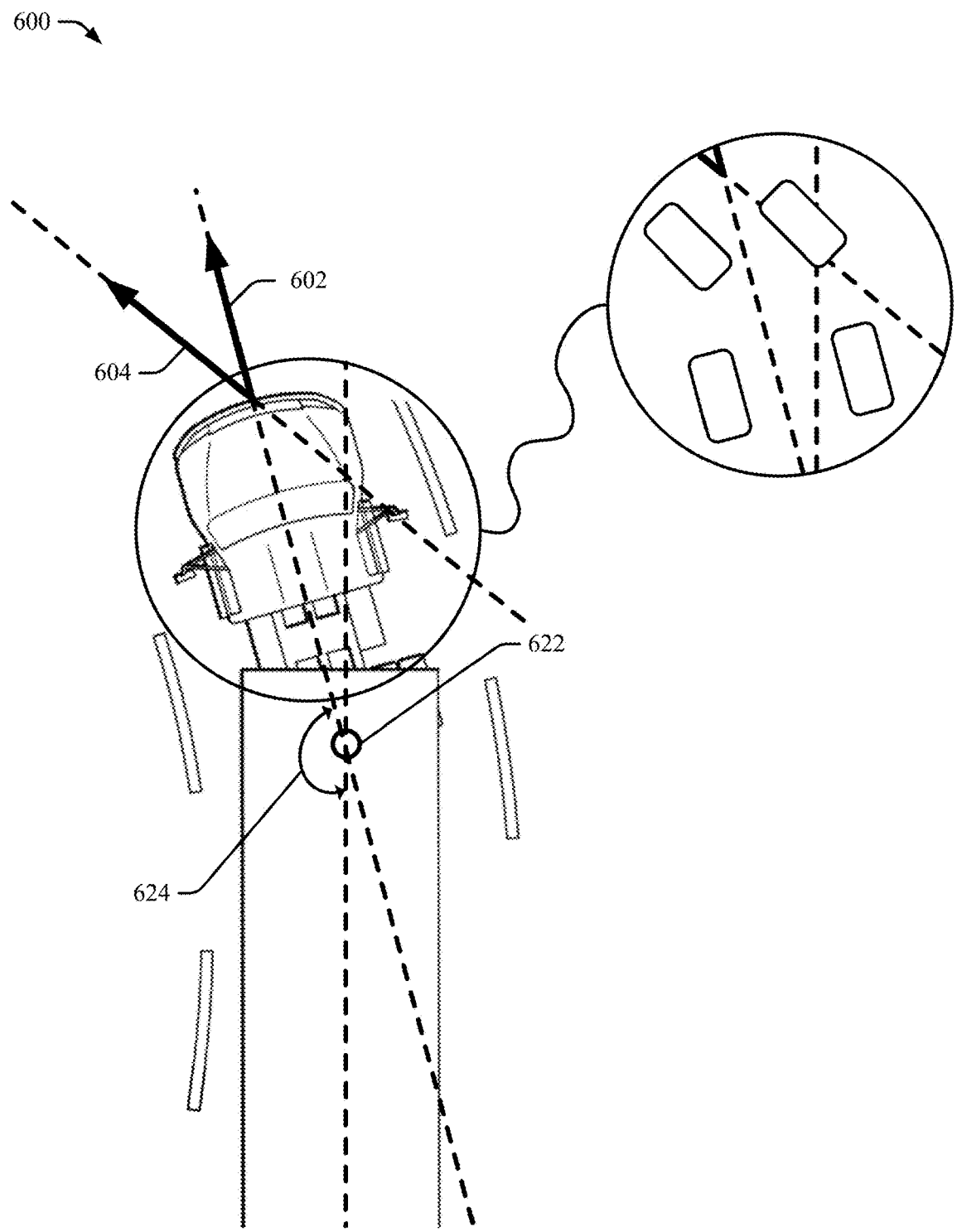
Figures 2, 6:
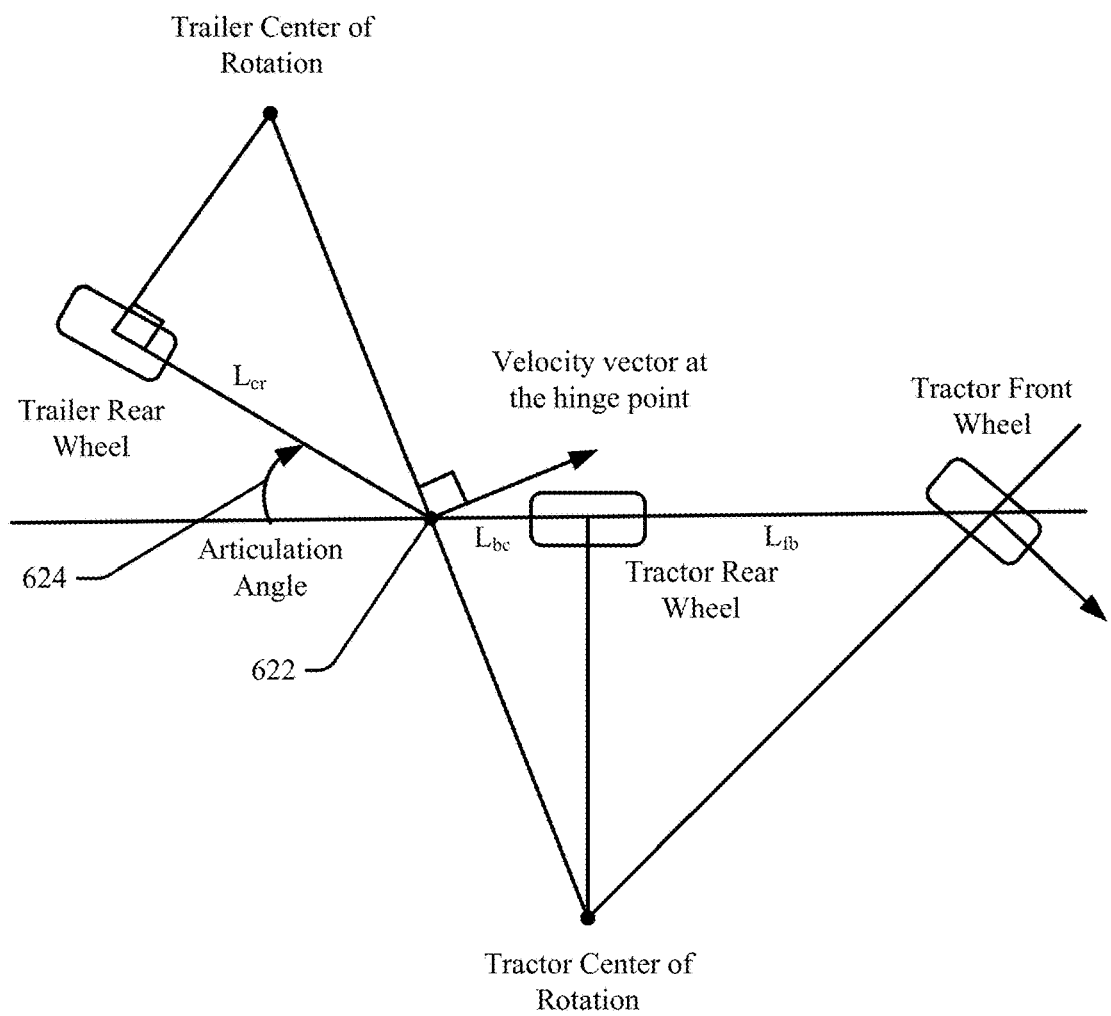

FIGS. 6-1 and 6-2 illustrate aspects of an accuracy improvement function of a radar system that is configured to track different sections of an articulated vehicle, in accordance with this disclosure. In each of the various examples described above, there is an implicit assumption that a velocity vector of a steerable section of an articulated vehicle (e.g., a tractor portion of a tractor-trailer vehicle) is parallel to that section's longitudinal axis and, therefore, can be used as a direct indication of the angular orientation of the velocity vector of the steerable section. In reality, if radar detections are associated with a front portion of the steerable section (e.g., a front portion of the tractor part of a tractor-trailer vehicle), then the angular orientation of the velocity vector of the steerable section may be reported as more closely related to the direction the front wheels are pointing.

For example, FIG. 6-1 includes an environment 600 in which a velocity vector 604 of a steerable portion of a tractor-trailer vehicle is reported by the radar system 104. Also represented in FIG. 6-1 is a direction 602 (angular orientation) of a longitudinal axis of the steerable portion of a tractor-trailer vehicle. The steerable portion is connected at a hinge point 622 to a trailer portion; the two portions of the tractor-trailer are meant to pivot at the hinge point 622 to affect an articulation angle 624 that is computed between them. A consequence of assuming that the velocity vector 604 is parallel to the direction 602 of the longitudinal axis is that edge positions may appear in an incorrect location, and the hinge point 622 may be incorrect. An articulated vehicle tracker, such as the articulated vehicle tracker 236, may invoke an accuracy improvement function, which reduces this inaccuracy.

To prevent or at least diminish this inaccuracy, position information, velocity information, and curvature information associated with front and rear bounding boxes may be used in combination with a tractor-trailer vehicle dynamics model to estimate the hinge point 622. The direction 602 can be computed as a parallel line to a connecting line between a front position of a front bounding box, with the hinge point 622.

For example, FIG. 6-2 depicts an example tractor-trailer dynamics model 630. The hinge point 622 is located at the intersection of the trailer's longitudinal axis with a line containing each of the trailer and tractor sections, one center of rotation (COR) for the tractor, and one COR for the trailer. The trailer section's longitudinal axis is the line containing the trailer's velocity vector at a rear position (which can be assumed to be centered laterally on the trailer). Each COR can be easily computed from this position, velocity, and curvature information.

For example, the radar system 104 updates, based on an accuracy improvement function, the bounding box 112-1 and the bounding box 112-2. By running track filters on the bounding boxes 112-1 and 112-2, the radar system 104 outputs dimensions including COR from the position, velocity, and curvature information reported from the track filters. The radar system 104 can compute the line intersection of the COR lines to obtain a position of the hinge point 622. The location of the hinge point 622 is assumed to be unchanging with time. Hence, any historical information regarding that position obtained under good conditions (e.g., with CORs on opposite ends of the tractor-trailer vehicle) can be used at a current time instant, even under bad conditions. Then, the articulation angle 624 is computed along with a pointing angle of the tractor portion.

There are a number of practical issues to be overcome for this Accuracy Improvement Idea to be feasible. Track filters executed by the radar system 104 can have time lags, especially in reporting a curvature estimate. This may cause the CORs computed using slow track filters to have significant levels of error. Because these CORs may be used to compute a line intersecting with the trailer longitudinal axis, there may be a significant error in the computed hinge point 622. If the two CORs are near each other, then the error in the computed intersection point will be particularly sensitive to the errors in the COR positions. In the extreme but presumably common case of an entire tractor-trailer vehicle being in a steady-state turn, the two CORs are to be located at the same position, theoretically making it difficult to identify the location of the hinge point 622. That said, a trailer's orientation may be unaffected by the outcome of the computation of the location of the hinge point 622; only its length may be affected.

The radar system 104 uses the accuracy improvement function to determine an updated velocity of the bounding box 112-1 and an updated velocity of the bounding box 112-2 and determine whether the object 106 is an articulated vehicle. Responsive to determining whether the object 106 is an articulated vehicle based on the updated velocities, the radar system 104 may output updated radar data that causes the vehicle 102 to perform a driving maneuver by separately or concurrently tracking the bounding boxes 112-1 and 112-2.

EXAMPLES

Some further examples of tracking articulated vehicles in proximity to a vehicle are described below.

Example 1. A method, comprising: tracking, by a first vehicle, a second vehicle driving in a field of view of a radar system of the first vehicle, the tracking of the second vehicle comprising: generating, using the radar system of the first vehicle, a first bounding box associated with a first section of the second vehicle and a second bounding box associated with a second section of the second vehicle; and determining, based on a first velocity vector associated with the first bounding box and a second velocity vector associated with the second bounding box, whether the second vehicle is an articulated vehicle; and responsive to determining that the second vehicle is the articulated vehicle, performing, by the first vehicle, a driving maneuver by separately and concurrently tracking, in the field of view, the first bounding box and the second bounding box.

Example 2. The method of example 1, further comprising: initiating the determining of whether the second vehicle is the articulated vehicle responsive to the second vehicle meeting or exceeding a threshold length; responsive to the second vehicle being the articulated vehicle, locating a hinge point on or between the first section and the second section of the articulated vehicle; and responsive to locating the hinge point, setting the first bounding box and the second bounding box to be non-overlapping.

Example 3. The method of example 2, further comprising: locating the hinge point responsive to the articulated vehicle driving on a curved road or taking a turn; and determining an articulation angle between the first bounding box and the second bounding box, wherein the articulation angle is greater than zero degrees.

Example 4. The method of example 3, further comprising: determining a width of the first bounding box; determining a width of the second bounding box; estimating a closest edge of the articulated vehicle to the first vehicle by using: the hinge point; the articulation angle; the first width; and the second width; and performing, by the first vehicle, the driving maneuver by avoiding driving unsafely close to or colliding with the articulated vehicle.

Example 5. The method of example 4, further comprising: further performing, by the first vehicle, the driving maneuver by avoiding the edge of the articulated vehicle.

Example 6. The method of example 1, further comprising: tracking, by the first vehicle, a third vehicle driving in the field of view of the radar system, the tracking of the third vehicle comprising: generating, using the radar system, a third bounding box associated with a first section of the third vehicle and a fourth bounding box associated with a second section of the third vehicle; determining, based on a third velocity vector associated with the third bounding box and a fourth velocity vector associated with the fourth bounding box, that the third vehicle is an unarticulated vehicle; and replacing the third bounding box and the fourth bounding box with a fifth bounding box associated with the first section and the second section of the third vehicle; and responsive to determining that the third vehicle is the unarticulated vehicle, performing, by the first vehicle, another driving maneuver by tracking, in the field of view, the fifth bounding box associated with the third vehicle.

Example 7. The method of example 1, further comprising: updating, based on an accuracy improvement function, the first bounding box and the second bounding box; determining, based on an updated first velocity vector associated with the first bounding box and an updated second velocity vector associated with the updated second bounding box, whether the second vehicle is an articulated vehicle; and responsive to determining that the second vehicle is the articulated vehicle based on the updated first velocity vector and the updated second velocity vector, separately or concurrently tracking, in the field of view, at least one of the first bounding box or the second bounding box to perform the driving maneuver.

Example 8. A system comprising at least one processor of a first vehicle, the at least one processor configured to: track a second vehicle driving in a field of view of a radar system of the first vehicle, the at least one processor configured to track the second vehicle by: generating a first bounding box associated with a first section of the second vehicle and a second bounding box associated with a second section of the second vehicle; and determining, based on a first velocity vector associated with the first bounding box and a second velocity vector associated with the second bounding box, whether the second vehicle is an articulated vehicle; and responsive to determining that the second vehicle is the articulated vehicle, perform a driving maneuver by separately and concurrently tracking, in the field of view, the first bounding box and the second bounding box.

Example 9. The system of example 8, wherein the at least one processor is further configured to track the second vehicle by: initiating the determining whether the second vehicle is the articulated vehicle responsive to the second vehicle meeting or exceeding a threshold length; responsive to the second vehicle being the articulated vehicle, locating a hinge point on or between the first section and the second section of the articulated vehicle; and responsive to locating the hinge point, setting the first bounding box and the second bounding box to be non-overlapping.

Example 10. The system of example 9, wherein the at least one processor is further configured to track the second vehicle by: locating the hinge point responsive to the articulated vehicle driving on a curved road or taking a turn; and determining an articulation angle between the first bounding box and the second bounding box, wherein the articulation angle is greater than zero degrees.

Example 11. The system of example 10, wherein the at least one processor is further configured to: track the second vehicle further by: determining a first length and a first width associated with the first bounding box; determining a second length and a second width associated with the second bounding; and estimating a closest edge, to the first vehicle, of the articulated vehicle by using: the hinge point; the articulation angle; the first length and the first width; and the second length and the second width; and perform the driving maneuver by avoiding driving unsafely close to or colliding with the articulated vehicle.

Example 12. The system of example 11, wherein the at least one processor is further configured to: perform the driving maneuver further by avoiding the edge of the second vehicle.

Example 13. The system of example 8, wherein the field of view comprises: a 360-degree field of view; one or more overlapping or non-overlapping 180-degree fields of view; one or more overlapping or non-overlapping 120-degree fields of view; or one or more overlapping or non-overlapping 90-degree fields of view.

Example 14. The system of example 8, wherein the at least one processor is further configured to: update, based on an accuracy improvement function, the first bounding box and the second bounding box; determine, based on an updated first velocity associated with the first bounding box and an updated second velocity associated with the updated second bounding box, whether the second vehicle is an articulated vehicle; and responsive to determining whether the second vehicle is an articulated vehicle based on the updated first velocity and the updated second velocity, further perform the driving maneuver based on whether the second vehicle is an articulated vehicle, separately or concurrently tracking, in the field of view, at least one of the first bounding box or the second bounding box.

Example 15. A computer-readable storage medium comprising instructions that, when executed, cause at least one processor of a first vehicle to: track a second vehicle driving in a field of view of a radar system of the first vehicle by at least: generating a first bounding box associated with a first section of the second vehicle and a second bounding box associated with a second section of the second vehicle; and determining, based on a first velocity vector associated with the first bounding box and a second velocity vector associated with the second bounding box, whether the second vehicle is an articulated vehicle; and responsive to determining that the second vehicle is the articulated vehicle, perform a driving maneuver by separately and concurrently tracking, in the field of view, the first bounding box and the second bounding box.

Example 16. The computer-readable storage medium of example 15, wherein the instructions, when executed, further cause the at least one processor to track the second vehicle by at least: initiating the determining whether the second vehicle is the articulated vehicle responsive to the second vehicle meeting or exceeding a threshold length; responsive to the second vehicle being the articulated vehicle, locating a hinge point on or between the first section and the second section of the articulated vehicle; and responsive to locating the hinge point, setting the first bounding box and the second bounding box to be non-overlapping.

Example 17. The computer-readable storage medium of example 16, wherein the instructions, when executed, further cause the at least one processor to track the second vehicle by at least: locating the hinge point responsive to the articulated vehicle driving on a curved road or taking a turn; and determining an articulation angle between the first bounding box and the second bounding box, wherein the articulation angle is greater than zero degrees.

Example 18. The computer-readable storage medium of example 17, wherein the instructions, when executed, further cause the at least one processor to track the second vehicle by at least: determining a first length and a first width of the first bounding box; determining a second length and a second width of the second bounding; and estimating a closest edge, to the first vehicle, of the articulated vehicle by using: the hinge point; the articulation angle; the first length and the first width; and the second length and the second width; and further cause the at least one processor to perform the driving maneuver by avoiding driving unsafely close to or colliding with the articulated vehicle.

Example 19. The computer-readable storage medium of example 18, wherein the instructions, when executed, further cause the at least one processor to perform the driving maneuver by at least: performing the driving maneuver by avoiding the edge of the second vehicle.

Example 20. The computer-readable storage medium of example 15, wherein the instructions, when executed, further cause the at least one processor to track the second vehicle by at least: updating, based on an accuracy improvement function, the first bounding box and the second bounding box; determining, based on an updated first velocity associated with the first bounding box and an updated second velocity associated with the updated second bounding box, whether the second vehicle is an articulated vehicle; and responsive to determining whether the second vehicle is an articulated vehicle based on the updated first velocity and the updated second velocity, performing the driving maneuver further based on whether the second vehicle is an articulated vehicle by separately or concurrently tracking, in the field of view, at least one of the first bounding box and the second bounding box.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims. In addition to radar systems, problems associated with bistatic conditions can occur in other systems (e.g., image systems, lidar systems, ultrasonic systems) that identify and process tracks from a variety of sensors. Therefore, although described as a way to improve radar detections of static objects, the techniques of the foregoing description can be applied to other problems to effectively detect bistatic conditions and take appropriate action.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed:

1. A method, comprising:
    tracking, by a first vehicle, a second vehicle driving in a field of view of a radar system of the first vehicle, the tracking of the second vehicle comprising:
        generating, using the radar system of the first vehicle, a first bounding box associated with a first section of the second vehicle and a second bounding box associated with a second section of the second vehicle; determining, based on a first velocity vector associated with the first bounding box and a second velocity vector associated with the second bounding box, whether the second vehicle is an articulated vehicle; and
        responsive to determining that the second vehicle is the articulated vehicle, identifying an intersection between the first velocity vector and the second velocity vector, and locating at the intersection a hinge point on or between the first section and the second section of the articulated vehicle; and
    responsive to determining that the second vehicle is the articulated vehicle, performing, by the first vehicle, a driving maneuver by separately and concurrently tracking, in the field of view, the first bounding box and the second bounding box.

2. The method of claim 1, further comprising
    initiating the determining of whether the second vehicle is the articulated vehicle responsive to the second vehicle meeting or exceeding a threshold length; and
    responsive to locating the hinge point, setting the first bounding box and the second bounding box to be non-overlapping.

3. The method of claim 2, further comprising:
    locating the hinge point responsive to the articulated vehicle driving on a curved road or taking a turn; and
    determining an articulation angle between the first bounding box and the second bounding box, wherein the articulation angle is greater than zero degrees.

4. The method of claim 3, further comprising:
    determining a width of the first bounding box;
    determining a width of the second bounding box;
    estimating a closest edge of the articulated vehicle to the first vehicle by using:
        the hinge point;
        the articulation angle;
        a first width; and
        a second width; and
    performing, by the first vehicle, the driving maneuver by avoiding driving unsafely close to or colliding with the articulated vehicle.

5. The method of claim 4, further comprising:
    further performing, by the first vehicle, the driving maneuver by avoiding the closest edge of the articulated vehicle.

6. The method of claim 1, further comprising:
tracking, by the first vehicle, a third vehicle driving in the field of view of the radar system, the tracking of the third vehicle comprising:
generating, using the radar system, a third bounding box associated with a first section of the third vehicle and a fourth bounding box associated with a second section of the third vehicle;
determining, based on a third velocity vector associated with the third bounding box and a fourth velocity vector associated with the fourth bounding box, that the third vehicle is an unarticulated vehicle; and
replacing the third bounding box and the fourth bounding box with a fifth bounding box associated with the first section and the second section of the third vehicle; and
responsive to determining that the third vehicle is the unarticulated vehicle, performing, by the first vehicle, another driving maneuver by tracking, in the field of view, the fifth bounding box associated with the third vehicle.

7. The method of claim 1, further comprising:
updating, based on an accuracy improvement function, the first bounding box and the second bounding box;
determining, based on an updated first velocity vector associated with the first bounding box and an updated second velocity vector associated with the second bounding box, whether the second vehicle is an articulated vehicle; and
responsive to determining that the second vehicle is the articulated vehicle based on the updated first velocity vector and the updated second velocity vector, separately or concurrently tracking, in the field of view, at least one of the first bounding box or the second bounding box to perform the driving maneuver.

8. A system comprising at least one processor of a first vehicle, the at least one processor configured to:
track a second vehicle driving in a field of view of a radar system of the first vehicle, the at least one processor configured to track the second vehicle by:
generating a first bounding box associated with a first section of the second vehicle and a second bounding box associated with a second section of the second vehicle; and
determining, based on a first velocity vector associated with the first bounding box and a second velocity vector associated with the second bounding box, whether the second vehicle is an articulated vehicle;
responsive to determining that the second vehicle is the articulated vehicle, identifying an intersection between the first velocity vector and the second velocity vector, and locating at the intersection a hinge point on or between the first section and the second section of the articulated vehicle; and
responsive to determining that the second vehicle is the articulated vehicle, perform a driving maneuver by separately and concurrently tracking, in the field of view, the first bounding box and the second bounding box.

9. The system of claim 8, wherein the at least one processor is further configured to track the second vehicle by
initiating the determining whether the second vehicle is the articulated vehicle responsive to the second vehicle meeting or exceeding a threshold length; and
responsive to locating the hinge point, setting the first bounding box and the second bounding box to be non-overlapping.

10. The system of claim 9, wherein the at least one processor is further configured to track the second vehicle by:
locating the hinge point responsive to the articulated vehicle driving on a curved road or taking a turn; and
determining an articulation angle between the first bounding box and the second bounding box, wherein the articulation angle is greater than zero degrees.

11. The system of claim 10, wherein the at least one processor is further configured to:
track the second vehicle further by:
determining a first length and a first width associated with the first bounding box;
determining a second length and a second width associated with the second bounding box; and
estimating a closest edge, to the first vehicle, of the articulated vehicle by using:
the hinge point;
the articulation angle;
the first length and the first width; and
the second length and the second width; and
perform the driving maneuver by avoiding driving unsafely close to or colliding with the articulated vehicle.

12. The system of claim 11, wherein the at least one processor is further configured to:
perform the driving maneuver further by avoiding the closest edge of the second vehicle.

13. The system of claim 8, wherein the field of view comprises:
a 360-degree field of view;
one or more overlapping or non-overlapping 180-degree fields of view;
one or more overlapping or non-overlapping 120-degree fields of view; or
one or more overlapping or non-overlapping 90-degree fields of view.

14. The system of claim 8, wherein the at least one processor is further configured to:
update, based on an accuracy improvement function, the first bounding box and the second bounding box;
determine, based on an updated first velocity associated with the first bounding box and an updated second velocity associated with the second bounding box, whether the second vehicle is an articulated vehicle; and
responsive to determining whether the second vehicle is an articulated vehicle based on the updated first velocity and the updated second velocity, further perform the driving maneuver based on whether the second vehicle is an articulated vehicle, separately or concurrently tracking, in the field of view, at least one of the first bounding box or the second bounding box.

15. A computer-readable storage medium comprising instructions that, when executed, cause at least one processor of a first vehicle to:
track a second vehicle driving in a field of view of a radar system of the first vehicle by at least:
generating a first bounding box associated with a first section of the second vehicle and a second bounding box associated with a second section of the second vehicle;
determining, based on a first velocity vector associated with the first bounding box and a second velocity vector associated with the second bounding box, whether the second vehicle is an articulated vehicle;

responsive to determining that the second vehicle is the articulated vehicle, identifying an intersection between the first velocity vector and the second velocity vector, and locating at the intersection a hinge point on or between the first section and the second section of the articulated vehicle; and responsive to determining that the second vehicle is the articulated vehicle, perform a driving maneuver by separately and concurrently tracking, in the field of view, the first bounding box and the second bounding box.

16. The computer-readable storage medium of claim 15, wherein the instructions, when executed, further cause the at least one processor to track the second vehicle by at least initiating the determining whether the second vehicle is the articulated vehicle responsive to the second vehicle meeting or exceeding a threshold length; and responsive to locating the hinge point, setting the first bounding box and the second bounding box to be non-overlapping.

17. The computer-readable storage medium of claim 16, wherein the instructions, when executed, further cause the at least one processor to track the second vehicle by at least:

locating the hinge point responsive to the articulated vehicle driving on a curved road or taking a turn; and determining an articulation angle between the first bounding box and the second bounding box, wherein the articulation angle is greater than zero degrees.

18. The computer-readable storage medium of claim 17, wherein the instructions, when executed, further cause the at least one processor to track the second vehicle by at least:

determining a first length and a first width of the first bounding box;

determining a second length and a second width of the second bounding box; and estimating a closest edge, to the first vehicle, of the articulated vehicle by using:
 the hinge point;
 the articulation angle;
 the first length and the first width; and
 the second length and the second width; and further cause the at least one processor to perform the driving maneuver by avoiding driving unsafely close to or colliding with the articulated vehicle.

19. The computer-readable storage medium of claim 18, wherein the instructions, when executed, further cause the at least one processor to perform the driving maneuver by at least:

performing the driving maneuver by avoiding the closest edge of the second vehicle.

20. The computer-readable storage medium of claim 15, wherein the instructions, when executed, further cause the at least one processor to track the second vehicle by at least:

updating, based on an accuracy improvement function, the first bounding box and the second bounding box;

determining, based on an updated first velocity associated with the first bounding box and an updated second velocity associated with the second bounding box, whether the second vehicle is an articulated vehicle; and responsive to determining whether the second vehicle is an articulated vehicle based on the updated first velocity and the updated second velocity, performing the driving maneuver further based on whether the second vehicle is an articulated vehicle by separately or concurrently tracking, in the field of view, at least one of the first bounding box and the second bounding box.

* * * * *